United States Patent
McMillan

(10) Patent No.: US 9,194,283 B2
(45) Date of Patent: Nov. 24, 2015

(54) SYSTEM AND METHOD OF TRANSDUCING ENERGY FROM HYDROGEN

(71) Applicant: Lawrence McMillan, Tulsa, OK (US)

(72) Inventor: Lawrence McMillan, Tulsa, OK (US)

(*) Notice: Subject to any disclaimer, the term of this patent is extended or adjusted under 35 U.S.C. 154(b) by 522 days.

(21) Appl. No.: 13/709,836

(22) Filed: Dec. 10, 2012

(65) Prior Publication Data
US 2014/0123923 A1    May 8, 2014

Related U.S. Application Data

(63) Continuation-in-part of application No. 13/488,998, filed on Jun. 5, 2012, now abandoned, and a continuation-in-part of application No. 13/463,360, filed on May 3, 2012, now Pat. No. 8,904,992.

(60) Provisional application No. 61/518,515, filed on May 6, 2011.

(51) Int. Cl.
*F02B 43/10* (2006.01)
*F02B 43/12* (2006.01)
*F02M 21/02* (2006.01)

(52) U.S. Cl.
CPC ............ *F02B 43/12* (2013.01); *F02M 21/0206* (2013.01); *F02B 43/10* (2013.01); *Y02T 10/32* (2013.01)

(58) Field of Classification Search
CPC .......... F02B 43/10; F02B 43/12; Y02T 10/32
See application file for complete search history.

(56) References Cited

U.S. PATENT DOCUMENTS

| | | |
|---|---|---|
| 3,512,508 A | 5/1970 | Winkler |
| 3,844,262 A | 10/1974 | Dieges |
| 3,961,609 A | 6/1976 | Gerry |
| 4,520,763 A | 6/1985 | Lynch et al. |
| 4,658,776 A | 4/1987 | Coman |
| 4,793,307 A | 12/1988 | Quenneville et al. |
| 4,805,571 A | 2/1989 | Humphrey |
| 4,862,841 A | 9/1989 | Stevenson |
| 4,944,255 A | 7/1990 | Duret |
| 5,161,491 A | 11/1992 | Graves |
| 5,209,190 A | 5/1993 | Paul |
| 5,255,637 A | 10/1993 | Schechter |
| 5,509,382 A | 4/1996 | Noland |
| 5,713,331 A | 2/1998 | Eisenbacher et al. |
| 5,794,584 A | 8/1998 | Gillespie |

(Continued)

FOREIGN PATENT DOCUMENTS

| | | |
|---|---|---|
| JP | 2005273505 | 10/2005 |
| JP | 2006029149 | 7/2006 |

(Continued)

OTHER PUBLICATIONS

International Search Report and Written Opinion, Korean Intellectual Property Office, Republic of Korea, Sep. 25, 2013.

(Continued)

*Primary Examiner* — Hieu T Vo
(74) *Attorney, Agent, or Firm* — Head, Johnson & Kachigian, P.C.

(57) ABSTRACT

A method of transducing energy from hydrogen, the method comprising: providing a chamber; maintaining a pressure of 75 psi to 30 in. vacuum within the chamber; injecting fuel into the chamber, where the fuel is hydrogen or a mix of hydrogen and oxygen; and igniting the fuel within the chamber.

14 Claims, 7 Drawing Sheets

(56) References Cited

U.S. PATENT DOCUMENTS

| | | |
|---|---|---|
| 5,867,984 A | 2/1999 | Zedan |
| 6,161,521 A | 12/2000 | Russ et al. |
| 6,189,495 B1 | 2/2001 | Tuckey et al. |
| 6,338,327 B1 | 1/2002 | Ogi et al. |
| 6,468,122 B1 | 10/2002 | Clements et al. |
| 6,601,549 B2 | 8/2003 | Clarke |
| 6,640,773 B2 | 11/2003 | Ancimer et al. |
| 6,668,769 B1 | 12/2003 | Palazzolo |
| 6,959,699 B2 | 11/2005 | Shinogle et al. |
| 7,325,528 B2 | 2/2008 | Schieber et al. |
| 7,367,306 B1 | 5/2008 | Holden |
| 7,458,364 B2 | 12/2008 | Allen |
| 7,584,724 B2 | 9/2009 | Berger |
| 7,661,409 B2 | 2/2010 | Schule |
| 8,275,538 B2 * | 9/2012 | Surnilla et al. ............... 701/113 |
| 8,904,992 B2 * | 12/2014 | McMillan ................... 123/294 |
| 2004/0187813 A1 | 9/2004 | Meyer |
| 2005/0072407 A1 | 4/2005 | Yu |
| 2007/0068481 A1 | 3/2007 | Campbell |
| 2008/0156297 A1 | 7/2008 | Sharpe |
| 2009/0173322 A1 | 7/2009 | Figl |
| 2009/0194065 A1 | 8/2009 | Okamura |
| 2010/0318284 A1 | 12/2010 | Surnilla et al. |
| 2011/0048374 A1 | 3/2011 | McAlister |
| 2011/0083637 A1 | 4/2011 | Blount |
| 2011/0247583 A1 | 10/2011 | Shkolnik et al. |
| 2012/0255517 A1 | 10/2012 | Grover, Jr. et al. |

FOREIGN PATENT DOCUMENTS

| | | |
|---|---|---|
| JP | 2007263100 | 10/2007 |
| JP | 2011109891 | 6/2011 |
| KR | 10-2010-0130610 | 12/2010 |
| WO | WO2006088289 | 8/2006 |

OTHER PUBLICATIONS

International Search Report and Written Opinion, Korean Intellectual Property Office, Republic of Korea, Mar. 24, 2014.

* cited by examiner

SYSTEM AND METHOD OF TRANSDUCING ENERGY FROM HYDROGEN

CROSS REFERENCE

This application is a continuation in part application based on and claiming priority to U.S. patent application Ser. No. 13/488,998 filed Jun. 5, 2012 and U.S. patent application Ser. No. 13/463,360 filed May 3, 2012, which was based on provisional U.S. patent application No. 61/518,514 filed May 6, 2011.

BACKGROUND OF THE INVENTION

1. Field of the Invention

This invention relates generally to a system and method of energy transduction, and more particularly, but not by way of limitation, to a system and method of transducing energy from hydrogen.

2. Description of the Related Art

Internal combustion engines, such as those used in automobiles, typically run on gasoline or other fossil fuel. Such an engine consumes 75% of the energy it produces to perform its task, leaving only 25% of the energy for usable power.

It is desirable to provide an energy transducer that does not depend on fossil fuel.

It is further desirable for such an energy transducer to run on hydrogen.

It is further desirable for such an energy transducer to allow for greater utilization of the energy it creates.

SUMMARY OF THE INVENTION

In general, in a first aspect, the invention relates to a method of transducing energy from hydrogen, the method comprising: providing a chamber; maintaining a pressure of 75 psi to 30 in. vacuum within the chamber; injecting fuel into the chamber, where the fuel is hydrogen or a mix of hydrogen and oxygen; and igniting the fuel within the chamber.

The chamber may be part of an energy transducer comprising: a cylinder with a first end and a second end; a piston within the cylinder, where the piston is connected to a connecting rod extending out of the second end of the cylinder and the connecting rod is connected to a crankshaft and where the chamber is within the cylinder and defined by the first end of the cylinder and the piston; a direct injector in fluid communication with the chamber and in fluid communication with a fuel tank such that the direct injector is capable of injecting the fuel from the fuel tank into the chamber; and an igniter located such that the igniter is capable of igniting the fuel within the chamber. Ignition of the fuel within the chamber may cause an explosion that forces the piston toward the crankshaft, causing the crankshaft to rotate 180°, followed by an implosion that forces the piston away from the crankshaft, causing the crankshaft to complete one full rotation.

The energy transducer may further comprise a hydrogen control valve connected to the direct injector to control the amount of fuel injected into the chamber. The energy transducer may further comprise an extractor in fluid communication with the chamber, where the extractor is connected to a vacuum tank via a vacuum control valve and where a vacuum is maintained within the vacuum tank by a vacuum pump, such that the pressure may be maintained within the chamber via the extractor. The extractor, vacuum control valve, vacuum pump, igniter, and direct injector may be controlled by a transducer control unit. The transducer control unit may be controlled by a throttle.

The chamber may be part of an energy transducer comprising: a body; a crankshaft; a rotor mounted to the crankshaft and housed within the body such that the rotor may rotate within the body along an axis defined by the crankshaft, where one or more of the chambers is located circumferentially around the rotor; an injector connected to the body such that the injector injects fuel into the one or more chambers; and an igniter connected to the body such that the igniter ignites the fuel in the one or more chambers, which causes the rotor to rotate. The one or more chambers may be each angled inward toward a direction of travel of the rotor. The energy transducer may further comprise a hydrogen control valve connected to the injector to control the amount of fuel injected into the one or more chambers. The igniter and the hydrogen control valve may be controlled by an electronic controller, which may be controlled by a throttle. The igniter may be located adjacent the injector, but further along a path of rotation of the rotor. The energy transducer may further comprise an exhaust port located within the body such that the exhaust port is capable of venting exhaust from the one or more chambers. The exhaust port may be located adjacent the injector, but prior to the injector along a path of rotation of the rotor.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a system and method for converting hydrogen to energy. The user may provide a chamber in which the energy transduction will occur. The pressure/vacuum within the chamber may be maintained at 75 psi to 30 in. vacuum. Hydrogen may be introduced within the chamber, and may then be ignited to produce energy.

Maintaining the pressure within the chamber at 75 psi to 30 in. vacuum may allow the hydrogen to fully combust. The hydrogen may totally consume itself, leaving no residue.

Figure 5:
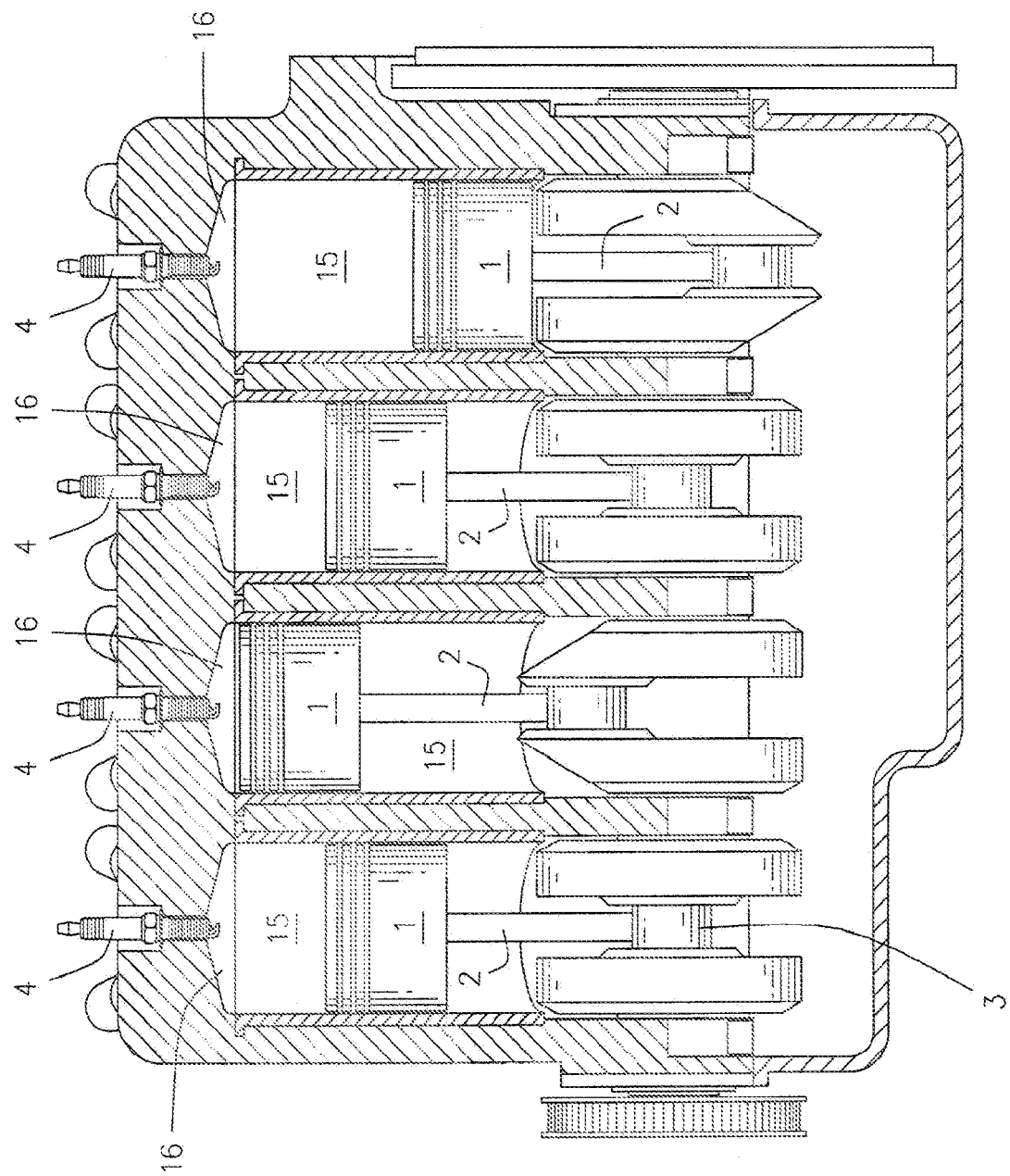
FIG. 5 is a side cut-away view of four cylinder piston pump example of the energy transducer described herein.

An energy transducer utilizing this method utilizes hydrogen rather than fossil fuels, capturing the energy within the hydrogen. As used herein, hydrogen may refer to a mixture of hydrogen and oxygen. The chamber may be part of a pump, such as a piston pump, rotary pump, thrust pump, or gear pump. Such an energy transducer may utilize a single pump or multiple pumps in any configuration. For example, FIGS. 1 through 4 show a single piston pump, FIG. 5 shows a four cylinder energy transducer, and FIGS. 6 through 9 show a single rotary pump, each of which is capable of carrying out the method set forth herein.

Figure 1:
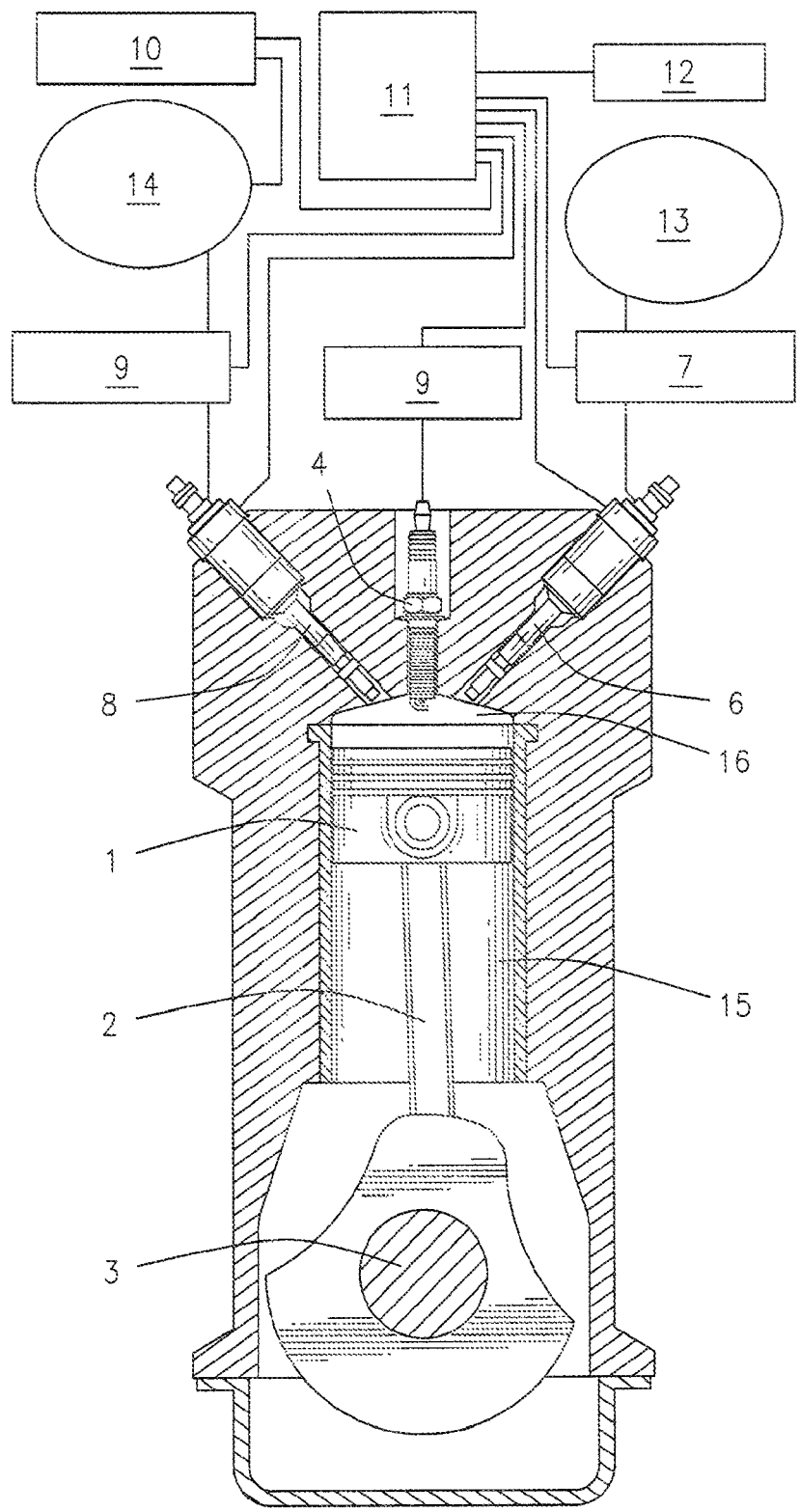
FIG. 1 is a diagrammatic view of a piston pump example of the energy transducer described herein.
Figure 2:
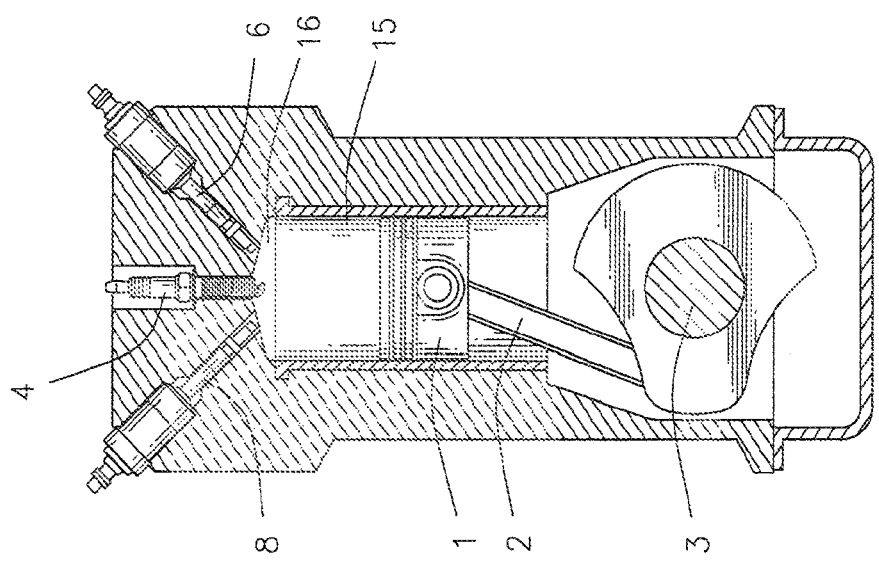
FIG. 2 is a cut-away view of the piston pump energy transducer at the beginning of a cycle.
Figure 3:
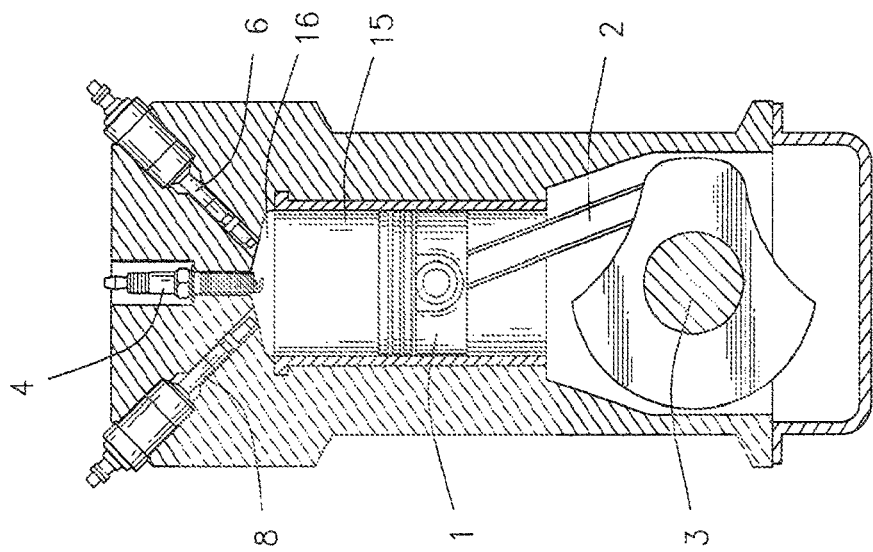
FIG. 3 is a cut-away view of the piston pump energy transducer partway through a cycle.
Figure 4:
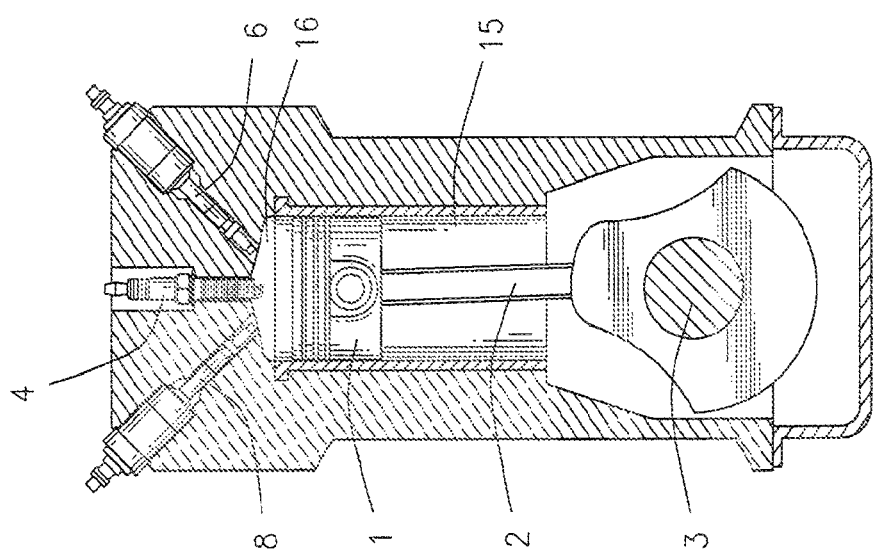
FIG. 4 is a cut-away view of the piston pump energy transducer approaching the end of a cycle.

FIG. 1 shows a piston pump, comprising a piston 1, a connecting rod 2, and a crankshaft 3. An energy transducer may comprise a cylinder 15 housing the piston 1 and at least part of the connecting rod 2. A chamber 16 may be formed within one end of the cylinder 15, defined by the piston 1. A direct injector 6 may be connected to the cylinder 15 such that the direct injector 6 may inject hydrogen into the chamber 16. A hydrogen control valve 7 may be connected to the direct injector 6 to control the amount of hydrogen injected into the chamber 16. A hydrogen storage tank 13 may be in fluid communication with the direct injector 6 via the hydrogen control valve 7.

An igniter 4, such as a spark plug, may likewise be connected to the cylinder 15 such that the igniter 4 may ignite the hydrogen within the chamber 16. A transducer control unit 11 may be connected to the cylinder 15 such that the transducer control unit 11 may monitor the pressure/vacuum in the chamber 16 and may adjust the chamber 16 to the proper pressure/vacuum, if required, via an extractor 8 in fluid communication with the chamber 16 and a vacuum tank 14 attached to the extractor 8 via a vacuum control valve 9 and maintained by a vacuum pump 10. The transducer control unit 11 may be in communication with the vacuum pump 10, vacuum control valve 9, and extractor 8. The transducer control unit 11 may also control an ignition coil 5 connected to the igniter 4, the hydrogen control valve 7, and the direct injector 6, thus controlling the overall function of the transducer. The transducer control unit 11 may be connected to a throttle 12, such that an operator of a vehicle utilizing the transducer may control the transducer via the throttle 12.

In use, the piston 1 may begin in a first position fully extended into the cylinder 15, such that the chamber 16 is as small as possible. The transducer control unit 11 may adjust the pressure within the chamber 16 to an optimal level, if required. The direct injector 6 may inject hydrogen into the chamber 16. The igniter 4 may ignite the hydrogen in the chamber 16, causing the hydrogen to explode. The hydrogen control valve 7 may control the amount of hydrogen required. The energy from the explosion may force the piston 1 along the cylinder 15, increasing the size of the chamber 16. The movement of the piston 1 may cause the connecting rod 2 to likewise move, causing the crankshaft 3 to rotate 180° until the piston 1 is in a second position fully withdrawn into the cylinder 15, such that the chamber 16 is as large as possible, given the stationary nature of the crankshaft 3. The explosion of the hydrogen may then turn into an implosion, creating a vacuum within the chamber 16, which may pull the piston 1 back into the first position, causing the crankshaft 3 to complete one full rotation. This movement may be seen in FIGS. 2, 3, and 4.

FIGS. 6 through 9 show a single rotary pump, comprising a body 21, a rotor 22, and a crankshaft 31.

Figure 6:
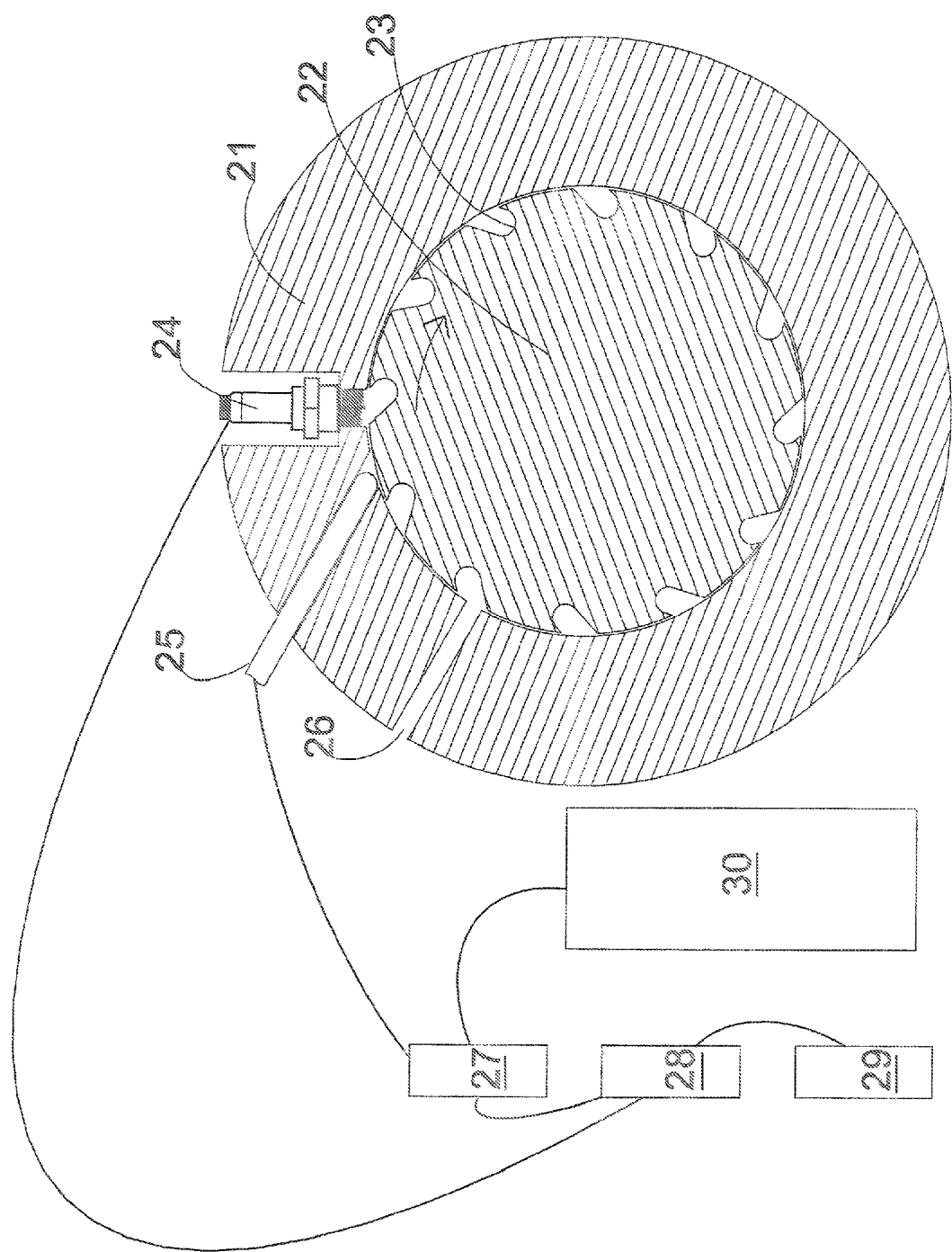
FIG. 6 is a diagrammatic view of a rotary example of the energy transducer described herein.
Figure 7:
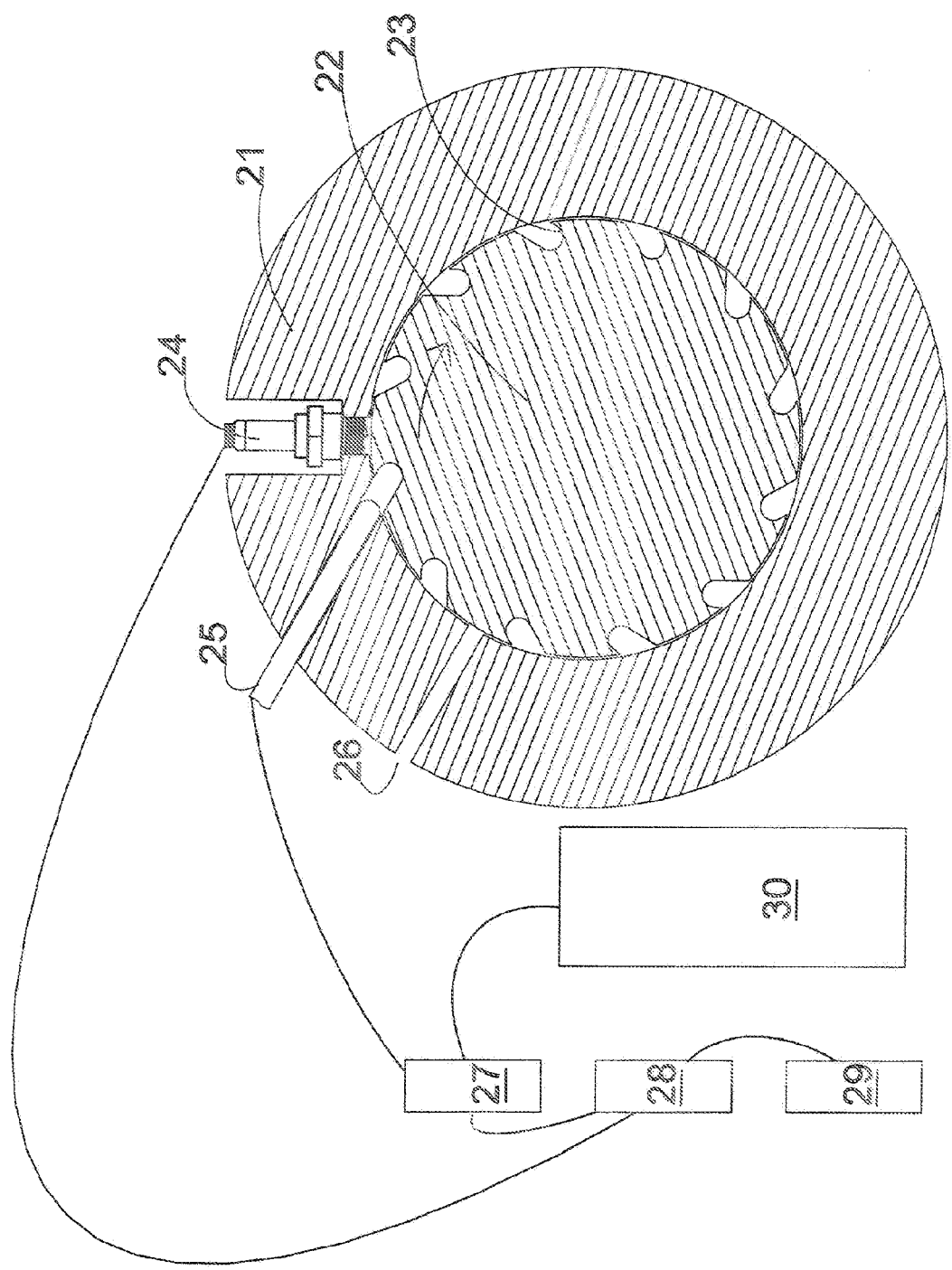
FIG. 7 is a diagrammatic view of the rotary energy transducer at the beginning of a cycle.
Figure 8:
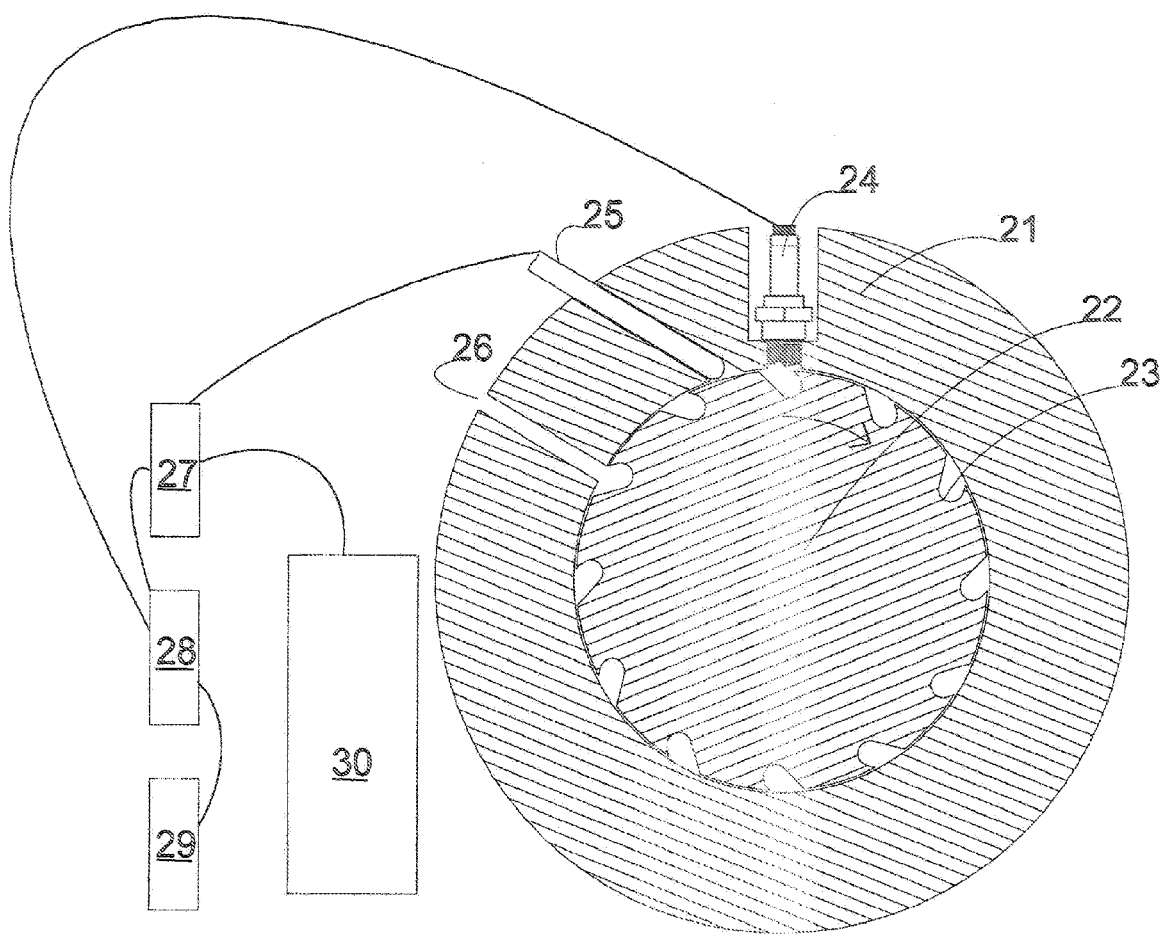
FIG. 8 is a diagrammatic view of the rotary energy transducer partway through a cycle.
Figure 9:
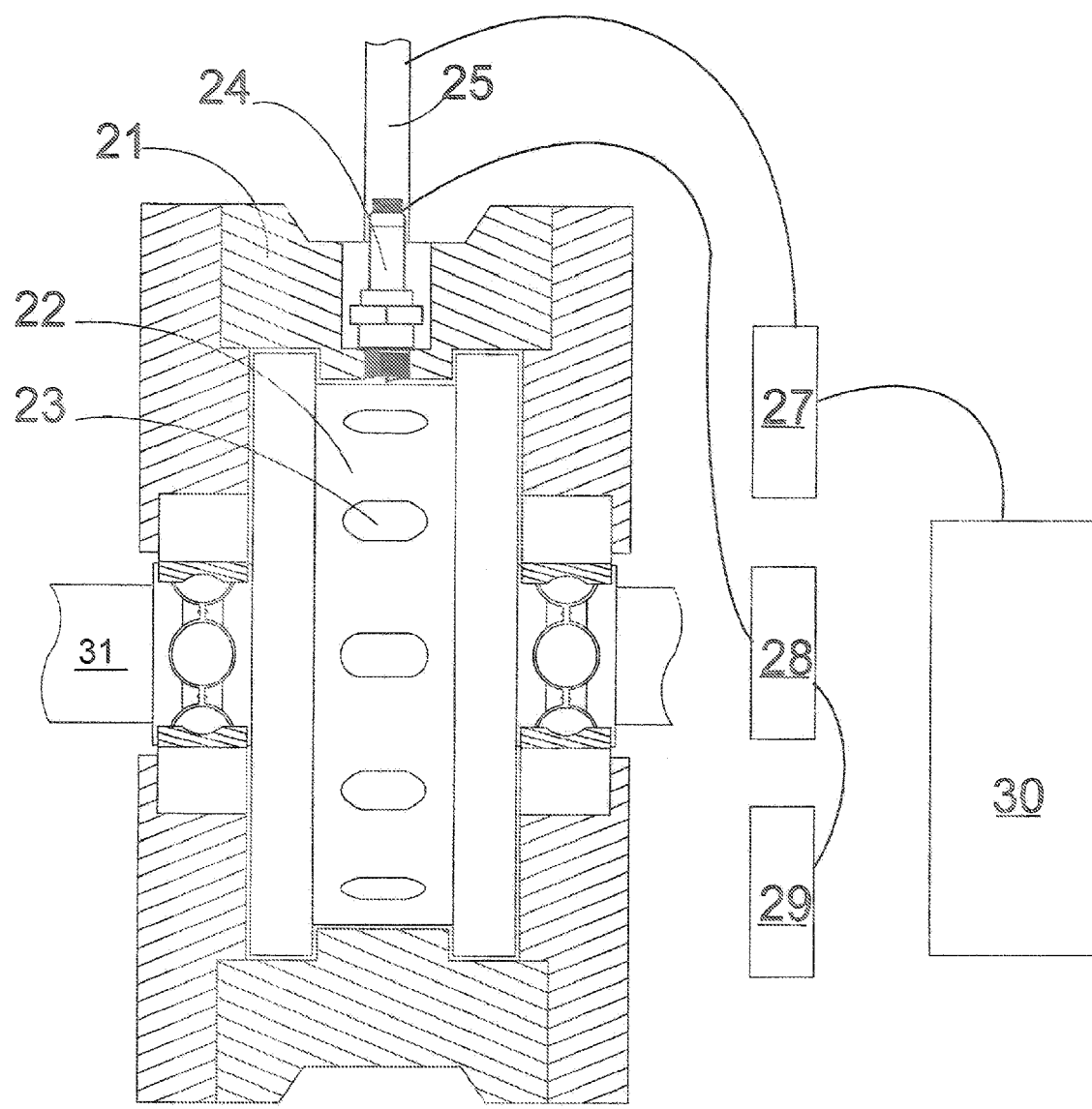
FIG. 9 is a side diagrammatic view of the rotary energy transducer.

The energy transducer may comprise a body 21 housing the rotor 22 such that the rotor 22 may freely rotate within the body 21 along an axis defined by the crankshaft 31. One or more chambers 23 may be located circumferentially around the rotor 22. The chambers 23 may be angled inward toward the direction of travel of the rotor 22, as seen in FIGS. 6 through 8. A direct injector 25 may be connected to the body 21 such that the direct injector 25 may inject hydrogen into the chambers 23 one at a time as the rotor 22 rotates. A hydrogen control valve 27 may be connected to the direct injector 25 to control the amount of hydrogen injected into the chambers 23. A hydrogen storage tank 30 may be in fluid communication with the direct injector 25 via the hydrogen control valve 27.

An igniter 24, such as a spark plug, may likewise be connected to the body 21 such that the igniter 24 may ignite the hydrogen within the chamber 23. The igniter 24 may be located near the injector 25, but further along the path of rotation of the rotor 22. The igniter 24 may be out of phase with the injector 25, such that when a chamber 23 is aligned with the igniter 24, there is not a chamber 23 aligned with the injector 25; likewise, when a chamber 23 is aligned with the injector 25, there is not a chamber 23 aligned with the igniter 24. An exhaust port 26 may also be located within the body 21 such that it may vent exhaust from the chambers 23 after ignition. The exhaust port 26 may be located near the injector 25, but before the injector 25 along the path of rotation of the rotor 22. The exhaust port 26 may also be out of phase with the injector 25, such that when a chamber 23 is aligned with the exhaust port 26, there is not a chamber 23 aligned with the injector 25, and when a chamber 23 is aligned with the injector 25, there is not a chamber 23 aligned with the exhaust port 26. An electronic controller 28 may be connected to the igniter 24 and the hydrogen control valve 27, thus controlling the overall function of the transducer. The electronic controller 28 may be connected to a throttle 29, such that an operator of a vehicle utilizing the transducer may control the transducer via the throttle 29.

In use, the rotor 22 begins with a chamber 23 aligned with the injector 25. The injector 25 injects hydrogen into one of the chambers 23. The rotor 22 rotates such that the chamber 23 bearing hydrogen is aligned with the igniter 24. The igniter 24 fires, causing the hydrogen in the chamber 23 to explode. This explosion forces the rotor 22 to rotate, which in turn causes the crankshaft 31 to rotate. This movement may be seen in FIGS. 7 and 8. When the chamber 23 in which the explosion occurred reaches the exhaust port 26, exhaust may be removed from the chamber 23. The process may be repeated cyclically for each of the chambers 23.

The energy/RPMs of the energy transducer may be controlled by the timing and/or size of the explosion of the hydrogen. The size of the chambers 23 is not important; the size of the rotor 22 controls the amount of power it makes.

Whereas, the devices and methods have been described in relation to the drawings and claims, it should be understood that other and further modifications, apart from those shown or suggested herein, may be made within the spirit and scope of this invention.

What is claimed is:

1. A method of transducing energy from hydrogen, the method comprising:
    providing a chamber;
    maintaining a pressure of 75 psi to 30 in. vacuum within the chamber;
    injecting fuel into the chamber, where the fuel is hydrogen or a mix of hydrogen and oxygen; and
    igniting the fuel within the chamber.

2. The method of claim 1 where the chamber is part of an energy transducer comprising:
- a cylinder with a first end and a second end;
- a piston within the cylinder, where the piston is connected to a connecting rod extending out of the second end of the cylinder and the connecting rod is connected to a crankshaft and where the chamber is within the cylinder and defined by the first end of the cylinder and the piston;
- a direct injector in fluid communication with the chamber and in fluid communication with a fuel tank such that the direct injector is capable of injecting the fuel from the fuel tank into the chamber; and
- an igniter located such that the igniter is capable of igniting the fuel within the chamber;

such that ignition of the fuel within the chamber causes an explosion that forces the piston toward the crankshaft, causing the crankshaft to rotate 180°, followed by an implosion that forces the piston away from the crankshaft, causing the crankshaft to complete one full rotation.

3. The method of claim 2 where the energy transducer further comprises a hydrogen control valve connected to the direct injector to control the amount of fuel injected into the chamber.

4. The method of claim 2 where the energy transducer further comprises an extractor in fluid communication with the chamber, where the extractor is connected to a vacuum tank via a vacuum control valve and where a vacuum is maintained within the vacuum tank by a vacuum pump, such that the pressure may be maintained within the chamber via the extractor.

5. The method of claim 4 where the extractor, vacuum control valve, vacuum pump, igniter, and direct injector are controlled by a transducer control unit.

6. The method of claim 5 where the transducer control unit is controlled by a throttle.

7. The method of claim 1 where the chamber is part of an energy transducer comprising:
- a body;
- a crankshaft;
- a rotor mounted to the crankshaft and housed within the body such that the rotor may rotate within the body along an axis defined by the crankshaft, where one or more of the chambers is located circumferentially around the rotor;
- an injector connected to the body such that the injector injects fuel into the one or more chambers; and
- an igniter connected to the body such that the igniter ignites the fuel in the one or more chambers, which causes the rotor to rotate.

8. The method of claim 7 where the one or more chambers are each angled inward toward a direction of travel of the rotor.

9. The method of claim 7 where the energy transducer further comprises a hydrogen control valve connected to the injector to control the amount of fuel injected into the one or more chambers.

10. The method of claim 9 where the igniter and the hydrogen control valve are controlled by an electronic controller.

11. The method of claim 10 where the electronic controller is controlled by a throttle.

12. The method of claim 7 where the igniter is located adjacent the injector, but further along a path of rotation of the rotor.

13. The method of claim 7 where the energy transducer further comprises an exhaust port located within the body such that the exhaust port is capable of venting exhaust from the one or more chambers.

14. The method of claim 13 where the exhaust port is located adjacent the injector, but prior to the injector along a path of rotation of the rotor.

* * * * *